United States Patent [19]

Petersson et al.

[11] 4,316,709

[45] Feb. 23, 1982

[54] CONTINUOUS BELT PRESS WITH CAPACITATIVE HEATING MEANS

[75] Inventors: Stefan Petersson, Skanör; Sven O. Alstad, Helsingborg, both of Sweden

[73] Assignee: Kockums Industri AB, Söderhamn, Sweden

[21] Appl. No.: 209,099

[22] Filed: Nov. 21, 1980

[30] Foreign Application Priority Data

Dec. 12, 1979 [SE] Sweden .............................. 7910239

[51] Int. Cl.³ .......................... B29C 1/00; B29C 3/00

[52] U.S. Cl. ......................... 425/174.8 E; 100/93 RP; 156/583.2; 156/583.5; 198/952; 219/10.53; 219/10.81; 425/371

[58] Field of Search ................. 425/174.8 E, 174.8 R, 425/371, DIG. 13; 264/25, 26; 100/151, 93 RP; 156/272–274, 583.2, 583.5; 219/10.53, 10.69, 10.71, 10.73, 10.81; 198/952

[56] References Cited

U.S. PATENT DOCUMENTS

| | | | |
|---|---|---|---|
| 2,433,067 | 12/1947 | Russell | 219/10.53 |
| 2,697,254 | 12/1954 | Gordon | 264/26 |
| 3,096,161 | 7/1963 | Morrison et al. | 219/10.69 |
| 3,496,255 | 2/1970 | Erxleben et al. | 425/174.8 E |
| 3,701,875 | 10/1972 | Whitsey et al. | 219/10.71 |
| 4,112,162 | 9/1978 | Casselbrant | 428/114 |
| 4,221,950 | 9/1980 | Lamberts et al. | 219/10.71 |

FOREIGN PATENT DOCUMENTS 823632 10/1951 Fed. Rep. of Germany .

*Primary Examiner*—Willard E. Hoag

*Attorney, Agent, or Firm*—Sughrue, Mion, Zinn, Macpeak and Seas

[57] ABSTRACT

A continuously operating heat-treatment press in which a continuously advanced layer (7) of material under pressure, for example including glue-coated wood chips, is heated dielectrically. The press is of the kind which comprises at least one endless, continuously running press chain (8), for maintaining a vertically acting press force on the layer (7) of material, said press chain (8) being formed of mutually linked support elements. The press surface of the support elements in the press chain (8) comprises mutually electrically insulated metal rods (23) extending in the transverse direction of the chain. At least one stationary electrode plate (28) connected to a high frequency generator is arranged adjacent said metal rods (23).

7 Claims, 2 Drawing Figures

CONTINUOUS BELT PRESS WITH CAPACITATIVE HEATING MEANS

Figure 1:
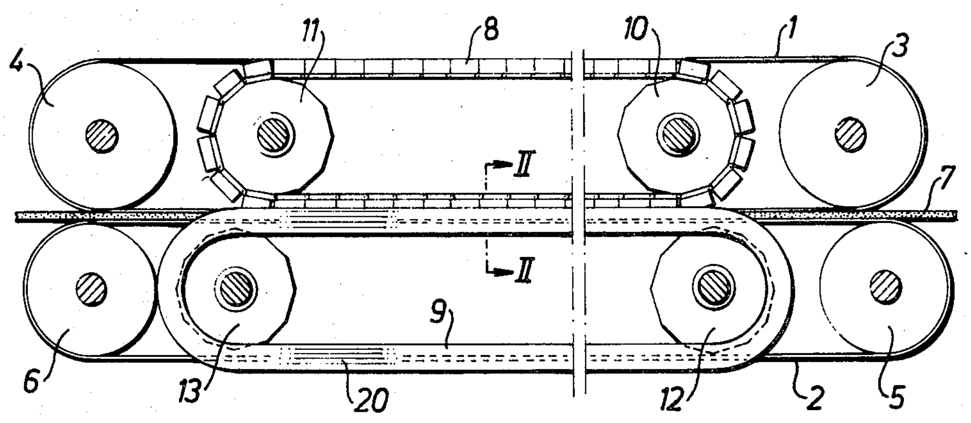

The present invention relates to a continuously operating heat-treatment press in which a continuously advanced layer of material under pressure, for example a layer of glue-coated wood chips, is heated dielectrically, said press being of the kind which comprises an endless, continuously running press chain formed of mutually linked support elements, for maintaining a vertically acting pressure force on said material layer.

When manufacturing products made of wood chips, said products are normally hardened under pressure in a static heat-treatment press. In the manufacture of elongate wood chip products, for example the manufacture of wood beams in accordance with the U.S. Pat. No. 4,112,162, it is desirable, however, to provide a continuously operating heat-treatment press, in which the product is heat-treated while continuously passing through the press. When it is desired, however, to harden the product with heat produced dielectrically problems occur, since a press belt and support plates co-acting therewith must pass between the electrodes generating the dielectric heat and the layer of material. Materials which have suitable electrical properties in respect of said support plates, however, have a low modulus of elasticity and low mechanical strength, and hence support plates which are manufactured from such material must of necessity have a thickness which is too excessive for their acceptable function.

One attempt to solve this problem is disclosed in the German Patent Specification No. 823 632, according to which there are utilized co-running electrodes. In order to obtain reasonable heating times there is required, for example when manufacturing a beam according to said U.S. patent, relatively high electrical power, in the order of 300 kW. In this respect, it is suitable to use a plurality of high-frequency generators with corresponding electrodes, which electrodes must be insulated from each other, i.e. spaced relatively great distance apart. When using co-running electrodes, which are thus stationary relative to the layer of material, one problem which arises is that the wood chips in those portions of the layer located between subsequent electrode plates are not heated to the extent required.

Consequently, a main object of the present invention is to provide a press of the kind mentioned in the introduction, in which stationary electrode plates can be used while avoiding the aforementioned problems. When using stationary electrode plates, the whole of the material layer will pass each and everyone of said plates, thereby eliminating the risk of certain parts of the layer not being heated to the extent required. Each plate will contribute to heating each separate unit of length of the material layer.

This object is achieved in accordance with the invention in that the press surface of the support elements in the press chain has the form of mutually electrically insulated metal rods extending transversely of the chain, and in that at least one stationary electrode plate is arranged adjacent said metal rods and connected to a high frequency generator. Since the metal rods are insulated from each other, each of said rods will function as a dielectric electrode and spread the electric field over the whole width of the layer of material. The metal rods can readily be given such dimensions as to enable said rods to apply the requisite pressure force to the material layer.

As a result of the small width of the metal rods and the air spaces located therebetween, there is obtained over a relatively short distance a sufficiently large voltage drop to enable two electrode plates to be placed relatively close to one another without creating problems due to interference. This enables the press as a whole to be kept relatively short and permits several generators to be used. In this way the rate of press feed and hence the capacity of the press is increased. Since the metal rods, which among other things serve to spread the electric field, extend over the whole width of the material layer, the electrode plates located adjacent said metal rods may be divided into mutually parallel segments, for example to enable the support plates which hold the metal rods together and support said rods to pass by.

Preferably the metal rods in each of said support elements are held together by means of at least two vertically oriented support plates made of an insulating material and extending in the longitudinal direction of the press chain, said plates being arranged to transfer the pressure force to said metal rods. Suitably a continuously running press band of insulating material is arranged between the press chain and the layer of material. Further, a smoothing layer of insulating material may be arranged on the surface of the support elements facing said material layer thereby to prevent imprints of the rods being formed in the pressed product.

Figure 2:
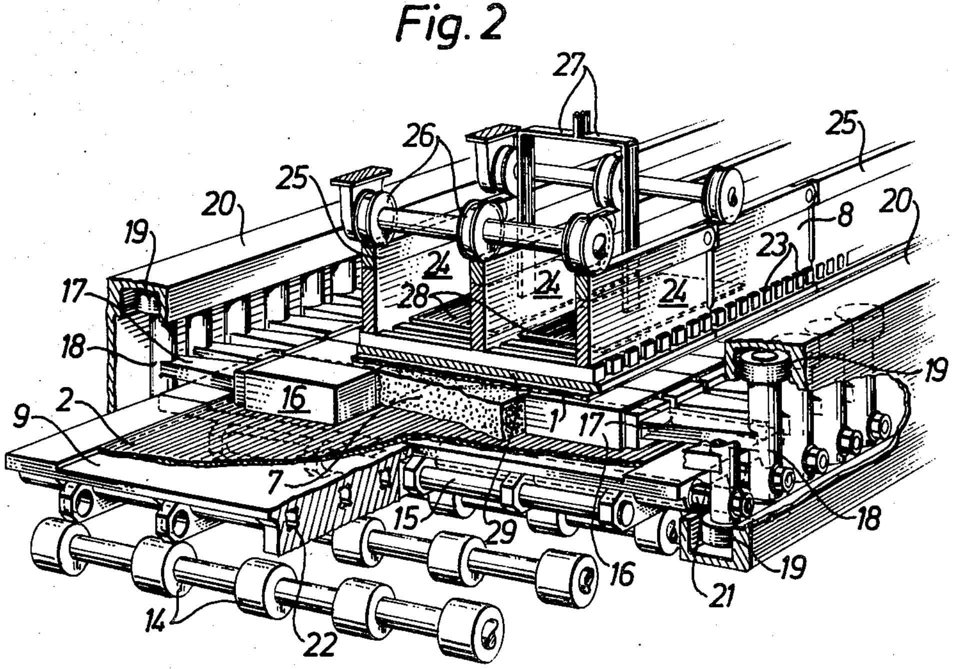

The invention will now be described in more detail with reference to the accompanying drawing, in which FIG. 1 is a schematic side view of an embodiment of a heat-treatment press according to the invention, and FIG. 2 is a perspective sectional view of the pressing and heat-treatment zone of the press according to FIG. 1, taken on the line II—II.

The heat-treatment press illustrated in FIG. 1 comprises an upper and a lower endless press belt 1 and 2, respectively, which run continuously over associated guide rollers 3, 4 and 5, 6, respectively. The belt 1 is made of an insulating plastics material while the belt 2 is made of steel.

The reference 7 identifies an incoming layer of material, for example a layer of glue-coated wood chips, which is to be heated dielectrically while being subjected to pressure in both a horizontal and a vertical direction. In the combined pressing and hardening zone, the belts 1 and 2 are supported by respective press chains 8 and 9 formed of mutually linked support elements. Each of the chains 8 and 9 passes over two rollers 10, 11 and 12, 13, respectively, of which two are driven synchronously with one another. The layer 7 is suitably taken from a pre-press, whereat means not shown are provided for retaining the dimensions of the layer of material during its travel from said pre-press to the combined pressing and heating zone in the heat-treatment press.

As will be seen from FIG. 2, the support elements of the lower press chain 9 are carried on rollers 14 and are mutually linked together by means of shafts 15. For the purpose of retaining the lateral dimensions of the layer of material, the press is provided on each side of the press belts 1 and 2 with an array of side pressing or restraining blocks 16 which project in between the press belts. Each of the side restraining blocks 16 is connected, via a press arm 17, with a holder 18 which is provided with two runners 19 arranged to co-act with outer guide rails 20 having upper and lower channel-shaped parts.

For the purpose of driving the side restraining blocks 16 synchronously with the press belts 1 and 2 and for accurately guiding the blocks in relation to said press belts, the holders 18 provided with said runners 19 are connected with horizontal shafts 21 which, via splined couplings, are displaceably mounted in holes 22 in the mutually linked support plates forming the chain 9. In this way exact guidance and synchronous driving of the side pressing blocks 16 is guaranteed, so as to prevent any relative displacement between said blocks and the material layer 7. Since the blocks circuit in a path oriented in the vertical plane, the total width of the press can be kept to a minimum.

To enable stationary electrode plates to be used for dielectrically heating the material layer 7, the press surface of the support elements of one press chain, in the illustrated embodiment the upper press chain 8, has the form of a plurality of metal rods 23 arranged transversely of the longitudinal direction of the press belt 1. The rods 23 are electrically insulated from one another and, in the illustrated embodiment, are held together by means of three vertically extending support plates 24 made of a suitable insulating plastics material and arranged in the longitudinal direction of the press belts. The plates 24 are provided at their upper edges with a longitudinally extending metal rail 25, said rails being arranged to co-act with support rollers 26 mounted in a frame structure.

For the purpose of dielectrically heating the layer of material, the press includes at least one high-frequency generator (not shown) which is connected to two electrode plate segments 28 via electrical connecting lines 27. Each electrode plate is divided into two sections 28, so as to leave a space for the central support plate 24 to pass through. If the central support plate is not required, the electrode plates may have the form of one piece structure. When using a greater number of support plates 24, said plates can be further divided into smaller sections. In all events the metal rods 23, which function as small dielectric electrodes, will distribute the electrical field over the whole width of the layer of material. The lower press chain 9 is earthed (grounded) and serves as the other electrode in the dielectric heating system. In the illustrated case, the side pressing blocks 16 are made of an insulating plastics material, to avoid direct sparking between the electrodes. Arranged between the rods 23 and the press belt 1 is a smoothing layer 29 of an insulating plastics material, which prevents the rods 23 from leaving an imprint in the pressed product. Alternatively, the spaces between the metal rods 23 can be filled with a suitable insulating material.

As beforementioned, the use of mutually spaced and mutually insulated metal rods enables a sufficiently large voltage drop to be obtained over a relatively short length to permit two adjacent electrode plates connected to different high frequency generators to be placed relatively close to one another without creating problems due to interference. This enables the capacity of the press to be increased while enabling the size of said press to be decreased in comparison with a press having co-running electrode plates. In addition, the risk of certain parts of the layer 7 of material not being heated to the desired extent is eliminated.

The aforedescribed embodiment is not limitive of the invention, but can be modified within the scope of the accompanying claims. Thus, the number and design of the electrode plates can be varied as desired and required. Further, the layer of material can be restrained laterally by other means than the illustrated side pressing blocks. The invention can also be applied with products where there is no need to restrain the sides of the layer. As will be understood, the upper and lower press belts and the support chains may change places, such that the electrode plates are located beneath the heat-treatment zone. The upper press belt may also be omitted, provided that the space between the rods is filled with insulating material or that smoothing, insulated plates are arranged on the underside of the rods in each support element. It is also possible to omit the lower press chain and/or the lower press belt. By the term "rods" as used above and in the following claims is meant any body, irrespective of shape, which has a finite width and extends transversely of the press chain.

What is claimed is:

1. A continuously operating heat-treatment press with dielectric heating of a continuously advanced layer of material under pressure, including for example glue-coated wood chips, said press being of the kind which includes at least one endless, continuously running press chain formed of mutually linked support elements, for maintaining a vertically acting press force on the material layer, wherein the press surface of the support elements in the press chain comprises mutually electrically insulated metal rods extending in the transverse direction of the chain; and at least one stationary electrode plate connected to a high frequency generator is arranged adjacent said metal rods.

2. A press according to claim 1, comprising a plurality of sequentially arranged, mutually insulated electrode plates, each of which is connected to a separate high frequency generator.

3. A press according to claim 1, wherein a continuously running press belt of insulating material is arranged between the press chain and the layer of material.

4. A press according to claim 1, wherein a smoothing layer of insulating material is arranged on the surface of the support elements facing the layer of material.

5. A press according to claim 1, wherein said press chain is arranged to press the material layer against a continuously running press belt arranged on the opposite side of the material layer, said press belt being made of steel and being grounded.

6. A press according to claim 1, wherein the metal rods in each and every one of said support elements are held together by means of at least two vertically extending support plates made of an insulating material and extending in the longitudinal direction of the press belts, said plates being arranged to transfer the press force to said metal rods.

7. A press according to claim 6, wherein when using more than two support plates, each electrode plate is divided in its longitudinal direction, to permit passage of the further support plates.

* * * * *